United States Patent
Eichner et al.

[11] 3,789,227
[45] Jan. 29, 1974

[54] ENVIRONMENTAL DOSIMETER OF THE THERMO-LUMINESCENT TYPE

[75] Inventors: Fred N. Eichner, Kennewick; Leo F. Kocher, Richland, both of Wash.

[73] Assignee: The United States of America as represented by the United States Atomic Energy Commission, Washington, D.C.

[22] Filed: May 18, 1973

[21] Appl. No.: 361,757

[52] U.S. Cl. ................................ 250/484, 250/337
[51] Int. Cl. .............................................. G01t 1/11
[58] Field of Search ........................... 250/337, 484

[56] References Cited
UNITED STATES PATENTS
3,229,097  1/1966  Durkee et al. ...................... 250/484
3,555,277  1/1971  Attix et al. .......................... 250/484

Primary Examiner—Archie R. Borchelt
Attorney, Agent, or Firm—John A. Horan; Arthur Churm; Hugh Glenn

[57] ABSTRACT

A dosimeter for accurately monitoring normally low-energy radiation includes thermoluminescent CaF phosphors enclosed within a tantalum capsule. The tantalum acts as a filter to weaken the measured dose due to photons having energies below about 0.2 MeV. Tantalum end caps are maintained on the capsule body by a polyolefin sheath formed from heat-contractable tubing. After exposing the dosimeter to environmental radiation, it is placed in a shielded chamber for about 24 hours and subsequently annealed at about 80°C. to release radiation energy accumulated in low-temperature traps. The dosimeter is then disassembled and the phosphors photometrically read at temperatures about 80°C. to determine the absorbed radiation dose.

9 Claims, 2 Drawing Figures

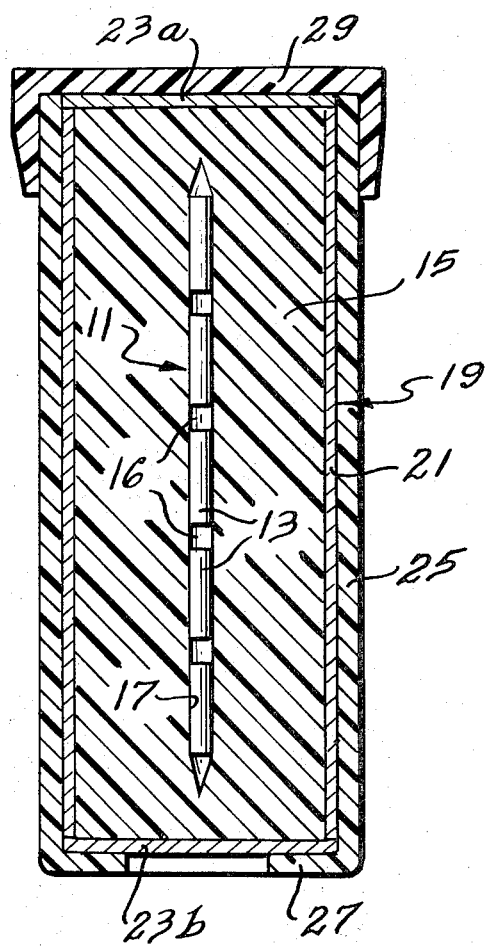

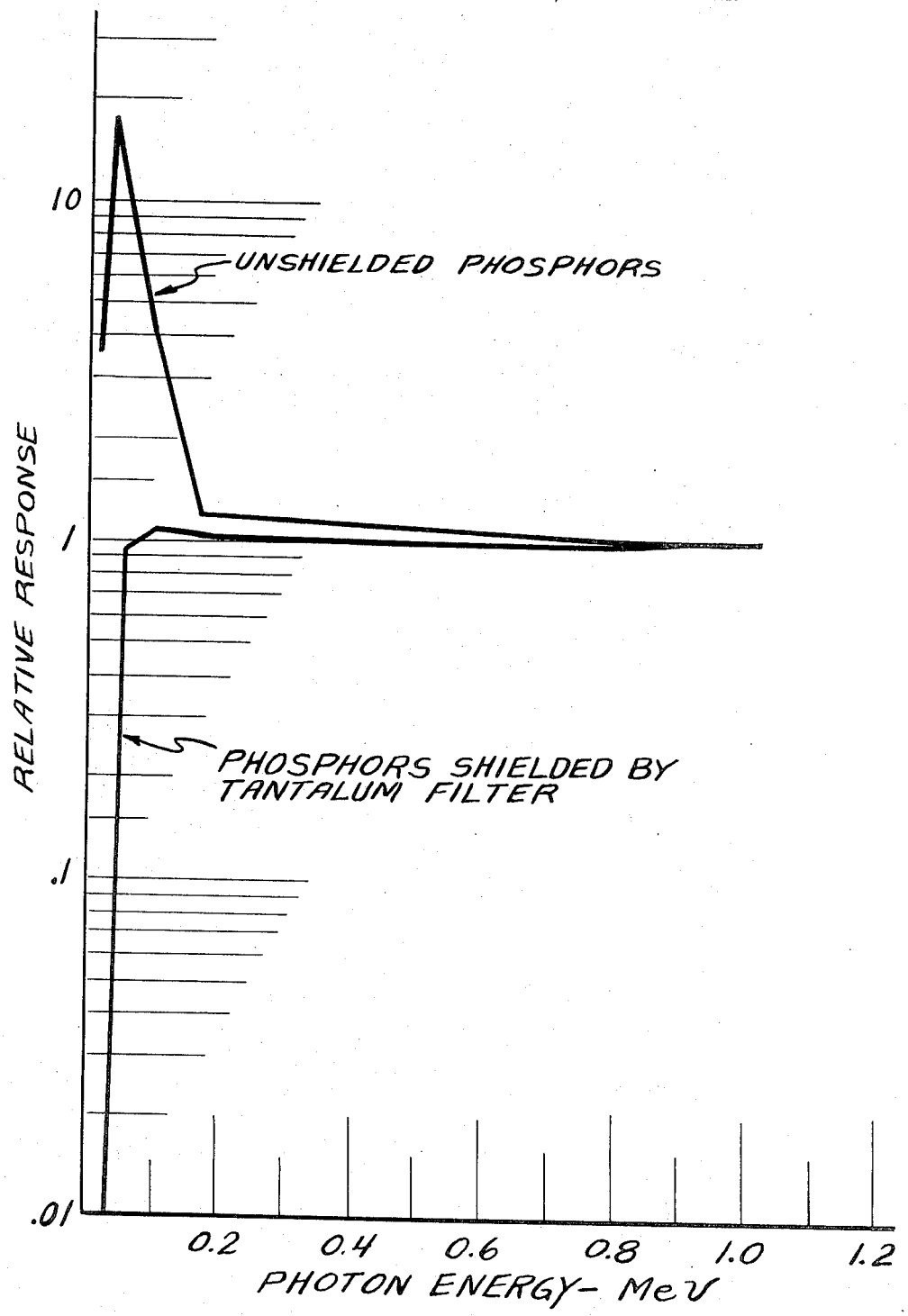

ENVIRONMENTAL DOSIMETER OF THE THERMO-LUMINESCENT TYPE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to environmental dosimeters that can be placed at various locations around a nuclear facility to estimate the radiation dose that would be sustained by an individual occupying that location. More particularly, the invention relates to dosimeters that employ thermoluminescent phosphors in measuring low-level radiation dose.

A thermoluminescent phosphor exposed to radiation will accumulate radiation energy by the movement of electrons from the valence band into F centers or color centers. More simply stated, the radiation energy is stored in traps between the valence and conduction bands of the phosphor atoms. The accumulated energy is correlatable to radiation dose that would be absorbed by an individual at the dosimeter location and can be termed dose capability or absorbed dose. The theory of energy accumulation in thermoluminescent phosphors is further explained in *Luminescence Dosimetry*, Proceedings of International Conference on Luminescence Dosimetry, Stanford University, Stanford, Calif., 1965, available as CONF-650637 from Clearinghouse for Federal Scientific and Technical Information, National Bureau of Standards, U. S. Department of Commerce, Springfield, Va. 22151.

Both LiF and $CaF_2$ phosphors have been used in this manner to measure absorbed dose, but it has been found that LiF phosphors require long exposures, for instance on the order of at least a month, in environments having low-radiation levels to store sufficient radiation energy for accurate dose readings. On the other hand, $CaF_2$ phosphors can accumulate sufficient radiation for meaningful and reproducible readings after only 5–7 days exposure to low-radiation levels, e.g., levels that would produce about 2 to 5 millirems total accumulated dose over that interval. However, $CaF_2$ phosphors greatly overrespond to low-energy radiation. It has been found that a CaF phosphor biased with dysprosium will give a sizable overresponse to sustained radiation below about 0.2 MeV. A maximum overresponse of about 17 times the actual dose received has been detected at about 30 KeV.

Various filter materials such as copper, brass, iron and lead have been employed in attempts to reduce this overresponse in CaF phosphors. However, no suitable filter material has previously been found. Most materials have failed to selectively attenuate low-energy radiation and others, particularly lead, which interact with the incident radiation to produce K-fluorescent X-rays give altered dose readings.

In reading thermoluminescent phosphors, the energy stored in traps is released as scintillating phosphorescence by elevating the temperature of the phosphor within a commercially-available, reader device. A reader will normally include a closed chamber for receiving and heating the phosphor and a photoelectric device for registering the resulting light scintillations. Readers of this type and methods of their use are more fully described in Cameron et al., *Thermoluminescent Dosimetry*, 75–100, University of Wisconsin Press, 1968. The energy stored in some of the traps is released at relatively low temperatures, while the energy in other traps requires a higher temperature to effect its release and detection. The energy within a low-temperature trap is more likely to fade and consequently result in inconsistent dose readings.

SUMMARY OF THE INVENTION

Therefore, in view of the limitations of the prior art, it is an object of the present invention to provide an uncomplicated and rugged radiation monitor for accurately determining environmental radiation dose.

It is also an object to provide a dosimeter containing a thermoluminescent phosphor which will register an effective amount of radiation to allow reproducible readings after a reasonable exposure time, but yet a dosimeter which will not greatly overrespond to low-energy photons.

It is a further object to provide an accurate method for determining environmental dose with a thermoluminescent phosphor wherein inconsistencies resulting from fade at low temperatures are minimized.

In accordance with the present invention, a dosimeter includes a $CaF_2$ thermoluminescent phosphor enclosed within a capsule. The capsule has walls including an effective thickness of tantalum to attenuate low-energy photons and thereby flatten the response of the phosphor in respect to absorbed dose when the dosimeter is employed to monitor environmental radiation.

After the dosimeter has been exposed to radiation energy, it is enclosed within a radiation-shielded chamber for about 24 hours and then annealed at 80°C. for about 20 minutes to release the energy from the low-temperature traps within the phosphor. Subsequently, the phosphor is heated to temperatures between 80°C. and 260°C. to release and detect, as absorbed dose, the energy stored in high-temperature traps. By omitting the low-temperature traps from the dose determinations, the effect of fade can be minimized to give more consistent readings.

BRIEF DESCRIPTION OF THE DRAWINGS

The present invention is illustrated in the accompanying drawings wherein:

FIG. 1 is a cross section of an environmental dosimeter; and

FIG. 2 is a graph with one logarithmic scale showing the relative response, in respect to administered dose, of $CaF_2$:Dy phosphors at various energy levels for unshielded phosphors and for phosphors shielded with tantalum.

DETAILED DESCRIPTION OF THE PREFERRED EMBODIMENT

Referring to FIG. 1, an assembled dosimeter is shown with an array 11 of individual thermoluminescent phosphors 13. Each phosphor 13 includes a calcium-fluoride salt doped with a minor portion by weight of dysprosium or other suitable impurity such as manganese. By employing a plurality of phosphors as shown, each may be individually read and the readings compared.

The individual phosphors 13 are maintained in an axial array within a foamed polyurethane or other plastic spacer 15. Spacer 15 is cylindrical in shape with an elongated, slotted opening 17 sized to snugly receive phosphors 13 in an axial array 11. Opening 17 can be formed by slitting the spacer to axial depth for a suitable distance along its length. The phosphors are then tucked into the opening and positioned as desired. Each phosphor 13 is shown separated from adjacent phosphors by small spaces 16 which may be eliminated to increase the number of phosphors carried within the dosimeter.

Spacer 15 and phosphors 13 are enclosed within a tantalum capsule 19. The capsule includes a tubular body portion 21 and two end closures 23a and 23b positioned over each end. One end surface of spacer 15 is pasted or otherwise bonded to the adjacent end closure shown as 23a to allow convenient assembly and removal of the phosphors 13 and spacer 15 from within capsule 19.

The walls of capsule 19 are of sufficient thickness of tantalum to selectively attenuate low-energy photons that would otherwise contribute a disproportionate amount to the dosimeter reading. It has been found that a wall thickness of 250–300 microns of tantalum will effectively attenuate photons below about 200 KeV to give a flat response, that is a response with minimal energy dependence, down to about 50 KeV where the phosphors begin to underrespond. However, absorbed dose attributable to these low-energy photons, particularly of about 30 KeV or less, is relatively small in comparison with that produced by photons of higher energy.

An alternate form of capsule 19 can be provided through use of a bimetallic wall structure to modify the filtering characteristics of the capsule walls. For example, a wall of about 250 microns thickness of tantalum bonded to about 50 microns thickness of another metal such as lead could be employed. However, a single layer of tantalum will be preferred where structural simplicity and minimization of secondary radiation from the capsule materials becomes of significant importance.

The end closures 23a and 23b of capsule 19 are held in place and the dosimeter sealed against dust, moisture, and ultraviolet as well as visible light by a polymerized hydrocarbon sheath 25. This sheath is a length of opaque heat-contractable tubing originally sized to slip over capsule 19 but capable of assuming a tight fit over the capsule on application of heat. As examples, an opaque tubing of polyethylene, polypropylene or various other polyolefin plastics can be selected for use in forming sheath 25.

Sheath 25 is shown disposed over capsule 19 in a manner to be flush with one end of the capsule body 21 and the outwardly disposed surface of end cap 23a. The opposite end of sheath 25 overlaps the capsule body 19 and closure 23b. This end of the sheath is radially contracted, as a result of heating at, for instance, 125°C. for about 15–20 minutes, to form an end covering 27 over part of the outer surface of end closure 23b. End covering 27 thus tightly secures closure 23b to the capsule body 21.

At the opposite end of the dosimeter from end covering 27, an end cap 29 of similar composition to sheath 25 is fitted over the sheath opening. The cap 29 is secured onto the dosimeter by bindingly overlapping the side portions of sheath 25 as shown. Its inner surface is bonded to end closure 23a to form an integral unit of the cap 29, closure 23a and spacer 15. Alternatively, a tapered end plug can be employed if sheath 25 is of sufficient length to overlap capsule 19 at both ends. An end covering as formed at 27 is prevented by inserting the tapered plug into one end of sheath 25 while heat-shrinking the sheath onto the capsule.

Through use of the heat-contractable sheath 25 and end cap 29 to secure the capsule together, it is unnecessary to weld or solder the tantalum parts. These operations, involving fusion of materials, are not only difficult to perform with tantalum, but also tend to alter the wall thickness. It is particularly important that the dosimeter of the present invention be provided with capsules of precise wall thickness to effectively attenuate low-energy photons and thereby minimize overresponse. In addition, it is desirable that the variations in wall thickness between capsules be small to provide consistent overall dosimetric results.

At thus described, the dosimeter is readily disassembled into two integral units. The first is glued or otherwise bonded together and comprises end cap 29, end closure 23a, foamed spacer 15 and the array 11 of thermoluminescent phosphors 13. The other or second unit includes the body portion 21 of capsule 19, closure 23b and sheath 25 as heat-shrunk over the capsule parts. The two units are easily assembled as shown in the drawing with spacer 15 inserted into capsule 19 or disassembled to allow removal of the thermoluminescent phosphors for reading or replacement.

In preparing $CaF_2$:Dy thermoluminescent phosphors for use, undamaged phosphors are washed with an organic solvent and annealed at about 400°C. for about 1 hour followed by annealing at 100°C. for 2 hours. The annealing and cooling are carried out in shielded ovens. During transfer between ovens and subsequent assembling of the dosimeters, exposure to ultraviolet light from, for instance, fluorescent sources and sunlight is avoided. The assembled dosimeters are stored in a shielded vault or container until they are required for use. It is preferred that the storage time be minimized to avoid accumulation of cosmic-ray dose prior to use.

The dosimeters are exposed to environmental radiation for at least 5 days, but ordinarily an exposure of about 10 days to two weeks is used to attain a sufficient, absorbed dose. During exposure, a dosimeter is contained within a plastic bag of, for instance, polyethylene or polypropylene and suspended by a cord from a cantilevered or other overhead support. The bag containing the dosimeter is suspended at a location about one meter above the ground to approximate the gonadal level of an individual. It is also held at least one-half meter from nearby structural members to minimize effects from reflected and secondary radiation. Use of plastics such as polytetrafluoroethylene and polyethylene in the supporting members can further reduce reflected and secondary radiation at the dosimeter.

Following exposure, the dosimeters are maintained in a shielded vault for about 24 hours to allow the initial, rapid fading of the phosphors to occur. Then the unopened dosimeters are given a second annealing at 80°C. for about 20 minutes prior to reading. This post-exposure annealing removes the radiation energy stored in the low-temperature traps of the phosphors and further ensures against error resulting from fading of the thermoluminescent response with time. It will be understood that, although the above delay and annealing times as well as temperatures are given in approximate values, accuracy is enhanced when all of the dosimeters are treated identically and in an identical manner to that used in calibrating the thermoluminescent reading to absorbed radiation dose.

After annealing, the dosimeters are disassembled in subdued light and the phosphors are read at temperatures between 80°C. and 260°C. in a commercially-available reader for thermoluminescent dosimeters. For example, a reader as described in Cameron et al., *Thermoluminescent Dosimetry*, cited above, would be suitable for this purpose. Each phosphor is read at least twice — the first to obtain a gross reading and the last to obtain the response of a blank phosphor. It is occasionally desirable to introduce an intermediate reading after the phosphor has cooled from the initial one to verify a complete readout of accumulated radiation energy. The net radiation energy absorbed or dose is represented by the difference between the first and the last reading. As with most measurements of this type, the net reading is related to actual dose in milliroentgens by a conversion or calibration function that is normally represented in graph form. The function is obtained by exposing similar dosimeters to known amounts of gamma radiation from, for instance, cobalt-60 or radium-226 sources.

A correction can be made for the amount of fade which occurs from the intial to the end portion of the exposure period. This correction is based on exponential fade of accumulated dose with estimated or empirically determined fade constants. The dose rate is given as follows:

$$D = R/(1 - e^{-0.0043T})$$

Eq. 1 where:

$D$ is the actual dose rate in microroentgens/hour
$R$ is the dose reading in microroentgens
$T$ is the exposure time in days.

The readings obtained with the presently described dosimeters are compared with similar readings obtained from the bare phosphors. The results are plotted in the two curves presented in the graph of FIG. 2. The upper curve represents reading of the bare phosphors, while the lower curve is composed of readings obtained from the assembled dosimeters including a tantalum capsule having 250 micron thick walls. The readings in both cases are presented in respect to the theoretical dose calculated from the gamma energy spectrum of a known source, i. e., a radium-226 gamma source, to give a relative response. The relative response is plotted against photon energy and ideally should have a value of 1.0 at all energy levels. It can be seen from the drawing that a flat response at about a relative response of 1 can be obtained down to about 50 KeV with the tantalum-shielded dosimeter. Relative responses below 1.0 down to 0.3 are obtained at energy levels of 50 KeV to 30 KeV. The absorbed radiation dose produced by photons having energy below 30 KeV becomes sufficiently low and can be disregarded, as it will normally be only a small fraction of the total dose. The upper curve in FIG. 2 illustrates the substantial overresponse in respect to dose produced by readings taken from the unshielded $CaF_2$:Dy phosphors.

It will be seen that the present invention provides a rugged and uncomplicated dosimeter for measuring environmental radiation along with an improved method for reading thermoluminescent phosphors. A thin-wall tantalum capsule encloses $CaF_2$:Dy thermoluminescent phosphors and thereby sufficiently attenuates low-energy photon radiation to avoid overresponse that would otherwise occur. By using an opaque polymerized-hydrocarbon sheath that can be sufficiently contracted by the application of heat to hold the end caps of the capsule onto the body, the welding of tantalum parts is avoided in assembling the dosimeter. Consequently, dosimeters having tantalum capsules of consistent thickness are provided with accompanying improved consistency in dosimetric readings. Other improvements in the method of the present invention allow inconsistencies that would result from fade in low-temperature traps to be minimized.

The embodiments of the invention in which an exclusive property or privilege is claimed are defined as follows:

1. A dosimeter for measuring environmental radiation dose with minimal overresponse to low-energy photons comprising:

A. a $CaF_2$ thermoluminescent phosphor; and
   B. a capsule enclosing said phosphor, said capsule having walls including an effective thickness of tantalum to attenuate low-energy photons and thereby minimize disproportionate dosimetric response of said $CaF_2$ thermoluminescent phosphor.

2. The dosimeter of claim 1 wherein said capsule includes a tubular portion with end closures, and wherein heat-contractable means are provided to secure said end closures onto said tubular portion.

3. The dosimeter of claim 2 wherein said heat-contractable means comprises a polyolefin sheath disposed in a shrink fit with one end of said sheath positioned flush with a first end closure of said capsule, and the opposite end of said sheath overlapping the opposite end and a second end closure of said capsule, said overlapping end of said sheath being radially contracted to tightly fit over said second end closure, and further comprises a removable polyolefin cap snugly disposed over the flush end of said polyolefin sheath and said first end closure.

4. The dosimeter of claim 1 wherein said phosphor is maintained at a coaxial location within said capsule by the interposition of foamed material to envelop said phosphor within said capsule.

5. The dosimeter of claim 4 wherein said foamed material is polyurethane foam.

6. The dosimeter of claim 1 wherein said capsule walls include a tantalum thickness of 250 to 300 microns.

7. A method of determining absorbed radiation dose in the dosimeter of claim 1 comprising:

A. maintaining said capsule with phosphor within a totally enclosed, radiation-shielded chamber for about 24 hours;
   B. annealing said phosphor at about 80°C. for about 20 minutes; and
   C. photometrically reading said phosphor for sustained radiation at termperatures between 80°C. and 260°C.

8. A method of determining environmental radiation dose with a dosimeter including a $CaF_2$ thermoluminescent phosphor comprising:

A. exposing said dosimeter to environmental radiation;

B. maintaining said dosimeter within a totally-enclosed, radiation-shielded chamber for about 24 hours;
C. annealing said phosphor at about 80°C. for about 20 minutes; and
D. photometrically reading said phosphor for sustained radiation at temperatures above 80°C.

9. The method of claim 8 wherein said thermoluminescent phosphor is preannealed at 400°C. for about 1 hour and maintained at 100°C. for about 2 hours prior to said radiation exposure.

* * * * *